March 29, 1966   L. B. TOROBIN   3,243,357
APPARATUS FOR LIQUID DROPLET DISPERSION
Filed Aug. 1, 1961   3 Sheets-Sheet 1

Leonard B. Torobin   INVENTOR

BY Richard H. Nagel

PATENT ATTORNEY

March 29, 1966 L. B. TOROBIN 3,243,357
APPARATUS FOR LIQUID DROPLET DISPERSION
Filed Aug. 1, 1961 3 Sheets-Sheet 2

FIG.-3

DROPLET CONCENTRATION GREATLY REDUCES RISE VELOCITIES

RISE VELOCITY OF DENSE DISPERSION/RISE VELOCITY OF SINGLE OIL DROPS IN INFINITE FLUID FEET/SEC.

$$\frac{\text{VOLUME OIL}}{\text{VOLUME OIL + BRINE}}$$

FIG.-4

BRINE OCCLUSION ALLOWS FILTRATION WITHOUT SOLVENT

FILTRATION RATE (PLANT BASIS) $\frac{\text{GAL. DWO}}{\text{HR./FT.}^2}$

FILTRATION TEMP. = 0°F.

% BRINE OCCLUDED

Leonard B. Torobin INVENTOR

BY Richard N. Nagel

PATENT ATTORNEY

FIG.-5

Leonard B. Torobin INVENTOR

United States Patent Office 3,243,357
Patented Mar. 29, 1966

3,243,357
APPARATUS FOR LIQUID DROPLET DISPERSION
Leonard B. Torobin, Newark, N.J., assignor to Esso Research and Engineering Company, a corporation of Delaware
Filed Aug. 1, 1961, Ser. No. 135,092
2 Claims. (Cl. 196—14.5)

This invention relates to a process of separating a crystallizable substance from a liquid in which said substance is soluble at certain temperatures and insoluble at lower temperatures in which said substance is crystallized from its solution by countercurrently contacting with a liquid immiscible coolant of different density than the solution containing the substance to be separated wherein one of the liquids is introduced in the form of a dense dispersion of uniform size droplets and the other as a continuous phase. Further, this invention relates to an improved centrifuge and centrifugation process for removing the crystallized substance from the mother liquor wherein the cooling medium is recirculated through the centrifuge to entrain the separated crystals. Specifically, the invention relates to a novel process of obtaining controlled rates of heat transfer between two immiscible liquids of different densities comprising countercurrently contacting the liquids by introducing one of the liquids into the bottom of the column in the form of a rising bed of a dense dispersion of uniform size droplets and introducing the other liquid into top of the column as a continuous phase.

Various methods have been used in an attempt to find a practical way of crystallizing substances from their solutions. Among these have been immiscible cooling in baffled towers. Efficient cooling with immiscible coolants in towers required having a considerable number of trays or baffles in order to obtain sufficient contact between the feed and coolant. In some instances, to obtain proper heat transfer, it was found that the baffles had to be placed only three inches apart. These baffled towers had several other disadvantages. They were relatively expensive, they were very large, and the material being crystallized tended to coat prematurely on the baffle trays and, after only a short period of operation, required extensive cleaning. This necessitated taking the towers out of operation for a considerable length of time and eventually this process was determined to be technically infeasible. It was found that the premature coating of the crystallizable material on the baffle trays was due primarily to the trays being colder than the feed in contact with it. This was due to the cold immiscible coolant in contact with the opposite side of the tray being at a lower temperature than the feed at that point. In contacting the immiscible coolants with the feed, frequently an emulsion resulted which was very difficult to separate. Whenever two-phase mixing or the spraying of one-phase into the other by conventional methods is employed, a wide Gaussian droplet sized distribution occurs. The extremely small drops of this distribution will have a very slow settling velocity. Some will be sufficiently small so that they will be permanently dispersed due to Brownian motion. This would result in permanent contamination of the decrystallized product or feed or coolant. A further disadvantage of the methods previously employed in direct cooling was the difficulty of obtaining uniform, controlled slow chilling rates which are required for proper crystal growth. Although the average chilling rate for proper crystal growth may be 1 to 2° F./minute for certain materials, local chilling rates far in excess of these values may occur due to the relatively small areas available for heat transfer and the large mixing lengths which characterize this type of equipment. These local chilling rates give rise to the formation of small crystals which exert a disproportionately large adverse effect on the separation. In indirect heat transfer apparatus, for example, shell and tube heat exchange equipment, an additional disadvantage is the relatively large temperature difference between the cooling surface and the feed being chilled. Reduction of this temperature difference is highly desirable for two reasons. In the first place, crystal growth is improved as the temperature difference is reduced and, secondly, the overall cost of the chilling process is reduced as the temperature difference is minimized, since it reduces the refrigeration requirement and allows a more efficient recovery of refrigeration. For a given rate of heat transfer, the temperature approach can, of course, be reduced by increasing the area for heat transfer. Indirect heat exchangers are generally limited in this respect because of mechanical limitations and the problem becomes particularly acute because restricted internals would readily become blocked with crystal formations.

Previous attempts to separate crystallized materials from their solutes have in many instances been unsuccessful due to the uneven and small crystal size developed in conventional heat exchange or cooling apparatus. Disc stack centrifuges did not separate these crystals efficiently due to their slow settling velocities in the mother liquor. In addition certain crystalline materials adhere to the disc stack or discharge surface and cause plugging.

As previously stated, when spraying one immiscible liquid into another, a wide sized distribution of droplets will result. The different sized droplets will rise in the coolant at different rates, some being shocked chilled and others being suspended in the tower or made to flow concurrently with the coolant. This wide size distribution occurs at the higher spray throughput velocities and is aggravated by a continuous phase vortex which is formed at the periphery of the spray head and which constitutes a major disturbance across the spray head surface.

An object of this invention is to provide a system with a very large interfacial area for controlled heat transfer between a feed to be treated and a coolant in order to obtain a minimum temperature approach between the coolant and the feed stream being processed. Another object of this invention is to make direct contact immiscible cooling for separation by crystallization feasible by avoiding the need for internals which clog with crystallized material. Another object of my invention is to provided an improved spray apparatus which generates uniform diameter droplets which will rise as a dense bed of droplets. A further object of my invention is to provide an economical, commercially feasible, continuous crystallization process which requires substantially less initial investment in equipment, little or no maintenance cost, and minimum operating expense. Another object of this invention is to solve the problem of emulsion difficulties which arises in any system using an intimate mixture of immiscible liquids. A further object of this invention is to provide an improved centrifuge and centrifugation process which allows the separation of crystallized substances from their solutes in disc type centrifuges. Other objects of this invention will readily appear to those skilled in the art.

Now, in accordance with my invention, feed containing a crystallizable material is charged to a treating column which has no internals, at a temperature above the freezing point of the crystallizable material, which enters the bottom of the treating column in the form of a dense spray. This dense spray is produced by a modified spray head and is made up of very closely packed uniform diameter droplets which rise in the column as a bed of spheres. A continuous, liquid coolant, phase is charged to the top of the column and moves downward countercurrently to the ascending dense bed of spheres. Because of the uniformity of the droplets making up the dense bed of spheres, the droplets rise uniformly in the column and are chilled at a controlled rate. The coolant is charged to the column at a temperature below the freezing point of the crystallizable material in the feed. By the time the dense bed of droplets reach the top of the column substantially all of the crystallizable material in the droplets is crystallized out. At the top of the tower, the crystals and solute form a slurry which is withdrawn from the top of the tower through annular take off. This slurry, is withdrawn from the top of the tower and can be either filtered or centrifuged to separate the crystals from the solute. The warm coolant is withdrawn from the bottom of the tower and cooled to its inlet temperature. This dense dispersion technique provides an extremely efficient method of heat transfer between two immiscible liquids. By controlling the diameter of the spheres and the volume hold-up of the dispersed phase, i.e., the percentage volume of spheres relative to the percentage volume of spheres plus immiscible coolant, the rate of rise of the spheres in the coolant, the rate of cooling of the spheres in the tower and the rate of crystallization of the material in the feed are controlled.

In order to obtain uniform size droplets from the spray head, I constructed an annular baffle at the periphery of the spray head; i.e. at the outer edge of the orifice plate, which serves to deflect the standing continuous phase vortex away from the orifice holes at the outer edge of the orifice plate. The orifices are made to protrude to discourage the wetting of the spray head surface. In doing this, I unexpectedly found that the critical throughput for a specific rate, above which non-uniform drops occurred, could be increased by about 80 to 100% with the annular baffle, over that without the annular baffle. This is sufficiently above the throughput rate required in dense dispersion systems so that the spray head diameter will generally be less than the diameter of the column.

In another embodiment of this invention, certain modifications where made to a conventional disc stack centrifuge which enables the use of the centrifuge to separate crystallizable material without coating and plugging the disc stack, periphery of the bowl, and the discharge port. In conjunction with the improved centrifuge apparatus, a process has been developed wherein the immiscible coolant is added to the centrifuge as a separate annular stream to entrain the heavier crystallized material, to remove it from the centrifuge, and to control the position of the interface between the crystallized material and the mother liquor in the centrifuge. In addition, the coolant is also added to the feed which is charged to the centrifuge and which provides a moving river of liquid on which the crystals may float and be removed from the stack in the centrifuge. The centrifuge and process of using it are claimed in application S.N. 156,758, filed on December 4, 1961, for Leonard B. Torobin.

In another embodiment of this invention, petroleum oils are dewaxed by countercurrently contacting the warm waxy oil with a cold immiscible coolant. In this application, the oil is sprayed into the treating column in the form of a dense dispersion of uniform waxy oil droplets which are countercurrently contacted with an immiscible coolant continuous phase, for example, water or calcium chloride solution. The coolant is charged to the tower as a continuous phase at a temperature below the pour point of the waxy oil and crystallizes the wax present in the oil which is removed as a slurry of the waxy crystals and oil from the top of the column. The wax crystals may be separated from the slurry by using the above mentioned improved centrifuge and by filtration.

In still another application of the invention, my efficient contacting process is used to desalinate water. In this process, salt water is used as the feed and is sprayed into the top of the tower in the form of a dense dispersion of uniform diameter droplets of salt water. The continuous coolant phase is introduced at the bottom of the column and countercurrently contacts the salt water at a temperature below the freezing point of the salt water which is sufficient to crystallize some of the water in the salt water solution. In one embodiment, the cold immiscible coolant may be a relatively pure middle distillate petroleum oil. A slurry of ice crystals and mother liquor is removed from the bottom of the treating tower and the crystals separated from the mother liquor by a basket centrifuge or other suitable apparatus. The novel process of desalinating water is claimed in a joint application, S.N. 163,215 filed on December 29, 1961, for Leonard B. Torobin and Donald L. Baeder.

The generation of the dense dispersion of uniform diameter droplets and the efficient heat transfer that is obtained, provides controlled cooling rates and the formation of relatively large even sized crystals which are easily separated from the feed solution. One of the principal advantages of the dense dispersion technique is that it overcomes the tendency of the sprayed material in the column to back mix and channel in the continuous coolant phase. The close packing of the dense dispersion acts as a three dimensional guide which discharges non-uniform motion. The modifications made to the centrifuge apparatus allow for the first time in disc-type centrifuge for automatic control of the interface between materials being separated without stopping centrifuge. The dense dispersion technique is readily applied to the dewaxing of whole waxy crudes or any fraction of petroleum oil. This process has also been adapted to the separation of potable water from saline solution. Further, where this technique is used solely as a means of heat exchange between two immiscible liquids, there is substantially no contamination of either of the liquids with the other liquid because of the uniform drop size and the absence of small droplets. All these advantages have come about by the controlled crystal growth made possible by the controlled rate of heat transfer between the liquid being treated and the immiscible coolant. The uniform growth of the crystals is due in part to the uniform environment surrounding each droplet containing crystallizable material.

The feed or the material from which a substance is to be crystallized must remain liquid under the conditions of spraying. For example, the crystallizable material should be completely dissolved in the feed prior to spraying and, after crystallization, the solute should remain in a fluid, easily handled state for ease in separating the crystallized material from the solute or mother liquor. Further, in order to prevent the formation of an emulsion or entrainment in the coolant of the feed, there must be sufficient density difference between the coolant and the feed so that they naturally separate by gravity flow. This difference should exist even after the crystallized material is separated from the feed. Any liquid material containing a dissolved substance, which will crystallize on cooling, is a suitable feed. The coolant should be immiscible or at most only partially miscible with the feed. Where it is undesirable to have the coolant contaminate the decrystallized feed, the coolant should be substantially immiscible with the feed. The only other requirements for the coolant are that it be of a different density than the feed and that it be liquid at the temperature to which the feed is to be cooled. Suitable coolants are water, oil fractions, pure chemicals, brines, liquid metals, and the like. However, certain coolants may be selected to simultaneously effect chemical reactions or extractions.

The suitable coolants for dewaxing petroleum oils are: water, aqueous salts, brines, and the like. In desalinating water, suitable coolants are oil fractions, edible vegetable oils, normally gaseous light hydrocarbons, and the like.

Various diluents may be added to the feed, from which the material is to be crystallized, in order to improve the viscosity of the feed being treated so that it may be more easily handled and/or to aid in the crystallization and separation of the crystals from the feed. Solvents for the feed may be added, as well as antisolvents for the materials being crystallized. Depending on the feed being treated, solvents such as alcohols, glycols, ketones, aromatic hydrocarbons, water, aliphatic hydrocarbons, and the like, may be used.

The superior efficiency of my process, as related to the heat transfer between coolant and treated feed, is attributed to the large area available for heat transfer between the sprayed feed and the continuous coolant phase. The critical feature of my invention is the manner in which the dense dispersion of feed is obtained and contacted with the coolant. In carrying out this invention, either the coolant or the feed being treated may constitute the denser liquid. The feed to be treated, however, is the one that is sprayed in the form of a dense dispersion. This dispersion, as previously stated, is generated by spraying the feed through a modified spray head in such a manner that the treating column is substantially filled with the spray droplets which ascend at a controlled rate or, for that matter, descend at a controlled rate countercurrent to a continuous coolant phase.

By carefully controlling the droplet size diameter in the range of ¼ to 1/24 inch, preferably in the range of ⅜ to 1/20 inch, though diameters of the size of ⅜ to 1/32 inch, may be used, I have been able to control the volume density of the dispersion and thereby control the rise velocity and rate of cooling of the feed. It is important that uniform spherical shaped droplets of narrow size distribution be obtained. If non-uniform diameter droplets are formed, as usually occurs in conventional spray columns, individual droplets will rise at different rates and controlled chilling of the feed cannot be obtained. This will result in a wide particle size distribution in the crystals formed and the smallest particles will either cause blinding in the filter medium or will not centrifuge at reasonable throughputs and gravitational fields. The dense dispersion of uniform diameter droplets provide maximum surface for heat transfer and result in maximum efficiency of heat transfer from the feed droplets to the coolant and subsequently from the warmed coolant to the cold decrystallized feed. By controlling the rate that a feed is charged to the treating tower, the droplet diameters and the rate of rise of the dense dispersion of the bed of spheres, I have been able to prevent shock chilling and have been able to form crystals which can be subsequently separated from the solute. Because of this efficient means of heat transfer the temperature difference between the two phases at any point in the column is minimized and therefore the growth of large crystals is enhanced. All of these advantages have been obtained without the droplets in the dense dispersion forming agglomerates. Although the droplets are very closely packed, they do not agglomerate as long as there is movement of the continuous coolant phase through the liquid bed of droplets. The feed to be crystallized can be charged to the treating tower at a rate of 15 to 325 $ft.^3$ per $ft.^2$ of column cross section per hour though rates of 35 to 150 $ft.^3/ft.^2/hr.$ are preferred; however, rates of 25 to 250 $ft.^3/ft.^2/hr.$ can also be used. The rate at which the feed is charged to the treating tower will depend on the feed temperature, the final crystallization temperature and the height of the column. The rate at which the feed is charged to the treating tower and countercurrently contacted with the immiscible coolant is sufficient to provide the desired dense dispersion of droplets which ascend the column at the desired velocity to provide the necessary rate of heat transfer and obtain proper chilling and crystallization in the droplets. The rate of ascent of the dense dispersion as a bed of spheres is more directly controlled by the volume density of the sprayed droplets in the descending immiscible coolant.

The difference in density between the two immiscible liquids being contacted is sufficient to separate the liquids by gravitational separation. The rate of ascent of the feed in the column is a function of the volume density and the feed rate. All of these variables have a direct effect on the cooling rate of the material being treated which is, of course, critical. Cooling rates of .25 to 15° F. per minute can be used, more preferably, rates of ½ to 7° F./minute are used, but depending on the materials being treated, the chilling rate can be 1–3° F./minute. One of the most important variables affecting the rate of ascent or descent of the material being treated in the treating column is the droplet holdup or, otherwise stated, the volume density of the droplets as compared to the volume density of the droplets and immiscible coolant phase. The other is the droplet diameter, which has been previously discussed. The volume holdup can be .50 to .80 $ft.^3$ feed/$ft.^3$ column, preferably a holdup of .65 to .77 $ft.^3$ feed/$ft.^3$ col. is used. The residence time of the droplet in the tower is determined, to a certain extent, by the desired chill rate and the chilling range. The rate and temperature at which the immiscible coolant is charged to the treating tower and contacted countercurrently with the dense dispersion of uniform diameter droplets affects the amount of cooling of the feed that is obtained. Throughput rates of coolant are comparable to the throughput rates of feed and will vary slightly with their relative specific heats and their respective densities. The input temperature of the coolant to the treating tower is sufficient to chill the droplets to the separation temperature and to crystallize or precipitate the desired amount of crystallizable material from the feed. This temperature will be 1 to 10° below the outlet temperature of the feed and 1 to 10° below the minimum crystallization temperature of the crystallizable material.

My separation process can be advantageously carried out at approximately atmospheric pressure. However, this way may change depending on whether or not a solvent is used to aid in reducing the viscosity of the feed or in the crystallization of the material being separated. Since it is desirable to maintain all of the reactants in the liquid phase when volatile solvents are used, sufficient pressure is employed to maintain these solvents in the liquid phase.

A uniform crystal growth has been obtained from various feeds by carefully controlling the rate of cooling with resulting crystals of size 25 to 1000 microns depending on the feeds and the conditions of crystallization, however, crystals of size 50 to 400 microns are more common. A uniform crystal growth under the controlled conditions of my inventive process has facilitated the separation of crystallizable materials from their various solutions. These separations have heretofore not been either efficient or economically feasible by direct immiscible coolant techniques known in the art.

In one of the principal applications of my novel process, petroleum oil fractions containing from 2–98% wax, or whole crudes containing from 2–30% wax, and specific fractions containing between 6 and 12% wax are treated in accordance with this process. Depending on the conditions of operation, all or part of the wax may be crystallized and separated from the feed. In treating petroleum oils to separate wax, it is desirable under certain circumstances to add from 1 to 10 to 10 to 1 parts by volume of solvent to the feed. These materials can be solvents for the oil or antisolvents for the wax or may be added primarily to improve the viscosity of the feed being treated. Solvent ratios of 1 to 3 and 5 to 1 of solvent to feed can also be used. For most feeds that will be treated, solvent ratios of 1 to 1, to 4 to 1 of solvent to feed are used. On the other hand, in treating certain feed stocks, for economic reasons, in accordance with my inventive process, I have found that I may dewax petroleum oils efficiently without the addition of any solvents. One of the improvements in the dewaxing art, which has been developed in conjunction with this dense dispersion technique, has been an improved method of separating the crystallized wax from the dewaxed oil by the use of a modified disc stack centrifuge. I have also unexpectedly found that the inclusion of 8 to 20% by volume of brine in the crystallized wax oil slurry, even in the absence of a solvent, results in sufficiently high separation rates to render this means of separation practical. Further, the inclusion of the brine in the wax oil slurry imparts sufficient mobility to the slurry to allow it to be moved through the various steps of the process. In the absence of a critical amount of brine the wax sets up in a solid matrix which cannot be processed.

The equipment used to carry out my invention is relatively simple and comprises two or more heat exchange towers without internals, means for transferring the feed and coolant between the towers and a means for adding makeup refrigeration. As previously stated, an appropriate separation means is required for separating the crystallized material from the feed; for example—a filter, centrifuge, or suitable screw pump extrusion device. Where the apparatus is used in a process for separating wax from petroleum oil, a 6,000 b./d. feed unit would require a tower 30 ft. in height and about 6½ ft. in diameter. The second tower for heat exchanging the warm coolant with the cold dewaxed feed would be of similar dimensions. The height and diameter of apparatus for a specific process can be varied to accommodate the required cooling for a specific feed.

A conventional spray head for introducing the feed into the column has been modified by placing at the outer edge of the orifice plate an annular baffle which deflects the standing continuous phase vortex away from the orifice holes at the outer edge of the orifice plate. The annular baffle is about 1/16 to 3/16 the diameter of the orifice plate in height and extends vertically upward from the outer edge of the plate. The orifice holes are made to protrude to discourage wetting of the spray head surface. This modification of the spray head permits the generation of the uniform diameter dense dispersion droplets that are required in carrying out my invention.

The top of the spray column (FIG. 2) has been modified in such a manner that the normal mixing that occurs between two fluids when one is introduced into another and when it is sought to separate one from the other, is greatly minimized. A good bit of the mixing is prevented by introducing the material uniformly through an air gap. To efficiently separate a lighter material from the heavier material being introduced through the air gap, I have devised an apparatus for trapping the heavier material and to some degree separating it from the lighter material being removed. The means for removing the lighter material is situated at the top of column 2 and comprises an annular chamber 32 which extends all the way around the top of the column and for part of the length of the top of the vertical cylindrical column 2. The top of said chamber 32 is approximately coterminous with the top of the column. The bottom of said chamber extends for part of the length down the column and communicates with the column by means of radial openings in the outer surface of the column and radial openings in the inner surface of said chamber. The openings are joined by a radial conduit 29 extending from the column to the annular chamber. The annular chamber is separated and thermally insulated from the column. Radially extending from about the top of said annular chamber and communicating therewith through openings 33 are take-off conduits 51 which extend horizontally for a short distance and then vertically downward to about the bottom of said chamber. The take-off conduits carry the removed material to a separation means. By use of this novel apparatus the lighter material is withdrawn from the top of the tower, while the heavier material is given time to separate from the lighter material in the annular chamber and runs back into column 2.

One of the embodiments of this invention comprises modifications made to a conventional disc stack centrifuge in order to enable it to handle crystalline materials which would normally interlock and clog. An important modification to the centrifuge was to provide a separate recycle river which circulated around the inner surface of the rotating centrifuge bowl and which was introduced in such a manner as to control the interface location between coolant, crystals and oil. By controlling this interface, the change in density of the oil wax slurry feed to the centrifuge did not upset the separation efficiency of the centrifuge.

The novel features of my invention may be perhaps better understood by referring to the accompanying drawings.

Figure 1:
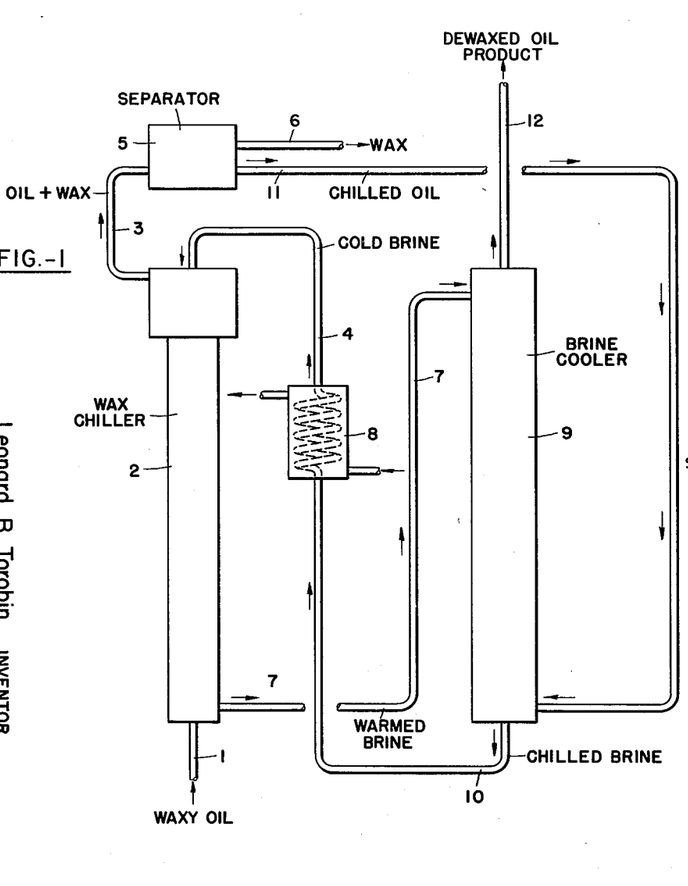
FIGURE 1 is a diagrammatic, elevational view of an immiscible cooling crystallizing apparatus containing two heat transfer towers; namely—a tower for crystallizing the crystallizable material in the feed and a second tower for heat exchange between the warm coolant and the cold treated liquid from which the crystallizable material has been separated. This diagram also shows a means of external heat exchange to provide makeup refrigeration for the immiscible coolant, and a separation apparatus for separating the crystallized material from the solute.

FIGURE 1 of the drawings describes an embodiment of my immiscible coolant separation process. A feed containing a crystallizable material is charged to treating column 2 through line 1 at a temperature sufficiently high to render all of the crystallizable material in the feed in solution and to render the feed sufficiently fluid that it may be conveniently handled. The feed is introduced in the column in the form of a dense dispersion of uniform diameter droplets of a size such that there is a maximum area for heat exchange between the sprayed droplets and the immiscible coolant liquid consistent with the optimum desired rise velocity. The liquid, from which the material to be crystallized, is charged at a rate which attains the desired volume density of sprayed droplets in the continuous phase. The feed rate is dependent upon, to a certain extent, the density difference between it and the coolant, as well as upon the rate at which the coolant is charged to column 2. The volume density of the droplets in the continuous phase; i.e., the holdup, is sufficient to obtain the desired rate of ascent in the column and, accordingly, the desired cooling rate. The dense dispersion of sprayed droplets rises in column 2 countercurrently to a descending continuous phase of coolant at a rate regulated in such manner that there is sufficient heat transfer from it to the coolant to crystallize out the required amount of crystallizable material present in the feed. The immiscible coolant is introduced through line 4 at a temperature selected to crystallize from the feed all or part of the crystallizable material present in the feed. The coolant is fed at such a rate that will not upset the countercurrent flow of the sprayed droplets. By controlling the rate of feed and coolant to column 2, the rate of ascent of the sprayed droplets in the tower is regulated so that there is sufficient heat transferred from the coolant to the feed in the column to crystallize the material present in the feed. By carefully controlling the droplet size and its holdup in the heat exchange column, and the temperature of the coolant and rate of the feed of the coolant, the rate of cooling of the droplet is controlled so that large easily separated crystals of the material to be crystallized are grown. In order to maintain effective countercurrency in the column, the difference in density of the two materials to be countercurrently contacted is such that they easily separate by gravitational force under the desired operating conditions so that the liquid fed into the bottom of the column is withdrawn at the top and liquid charged to the top of the column is withdrawn from the bottom of the column. The sprayed dense dispersion of droplets are allowed to stay in contact with the coolant for a sufficient time to form large easily separated crystals and to crystallize all or part of the crystallizable material present. The crystallized material and the solute form a slurry which is removed from the top of the column through an annulus which traps out any entrained continuous phase through line 3 and is charged to an appropriate separation apparatus 5. The pressure under which the countercurrent contact takes place is such that all of the materials remain in the liquid phase. Separation means 5 removes the crystallized material from the chilled solute or mother liquor which liquid is taken by line 11 to another heat exchange column 9 wherein the chilled decrystallized mother liquor is countercurrently contacted with the warm coolant removed from bottom of column 2 via line 7 and charged to column 9. The warm coolant and cold mother liquor are countercurrently contacted in similar dense dispersion technique as used in column 2 in order to conserve refrigeration. Since the temperature approaches in each of the columns are within 1 to 10° F., an extremely efficient heat transfer is obtained. The chilled coolant is removed from the bottom of column 9 through line 10 and contacted with a conventional external heat exchange means 8 wherein makeup refrigeration is added to reduce the temperature of the coolant to the desired inlet temperature. Heat exchange means 8 provides the makeup refrigeration for loss due to the heat of crystallization of the material being crystallized and refrigeration loss to the walls of the heat exchange towers and associate apparatus. The feed free of crystallizable material, and after heat exchange with the coolant, is withdrawn from tower 9 through line 12.

It is to be understood that more than one treating tower and one heat exchange tower may be used and that all or part of the crystallizable material present in any feed may be removed in one or more of treating towers.

This invention has other utilities and may be used to concentrate materials such as fruit juices, milk, waste liquors etc. by crystallizing part or all of the crystallizable water present, and in any process where efficient heat transfer and controlled chilling are critical features. The process of concentrating aqueous liquids is claimed in a joint application S.N. 163,214 filed on December 29, 1961, for Leonard B. Torobin and Donald L. Baeder.

For purposes of description, FIGS. 2 and 6 will be described in connection with dewaxing of petroleum oil.

Figure 2:
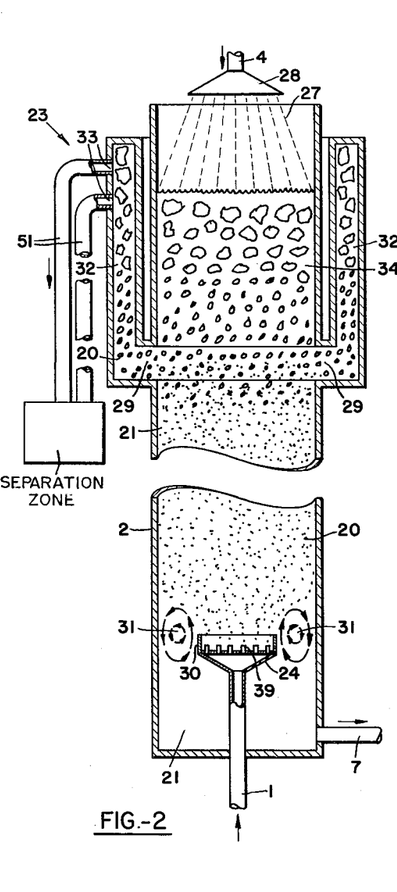
FIGURE 2 is of the drawings is a diagrammatic, elevational view of the dense dispersion treating tower showing in more detail how the crystallizable material and the coolant are introduced into the tower.
Figure 3:
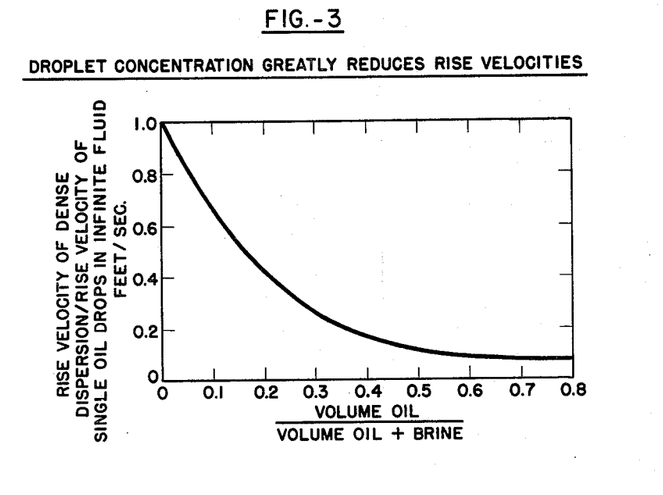
FIGURE 3 is a graphic representation showing the effect of droplet concentration on the ratio of rise velocity of the dense dispersion to the rise velocity of a single drop in an infinite fluid.

Now referring to FIG. 2, a petroleum oil containing 6–30 weight percent of wax, based on feed, is charged to spray head 24 via line 1 through protruding orifice openings 29 and into heat exchange column 2. The feed is charged at a temperature above its pour point of 50 to 120° F. Where it is necessary or desirable to use a solvent in dewaxing the oil, it is used in a ratio of 1 to 4 and 4 to 1 of solvent to oil feed. Annular baffle 30, which is placed at the outer edge of spray head 24 which contains protruding orifices 29 extends vertically upward from the outer edge for a distance of ⅛ the spray plate diameter and deflects the standing vortex 31 of the continuous cooling phase outward and away from the vicinity of the spray head. The waxy oil feed introduced through spray head 24 forms a dense dispersion of uniform diameter droplets 20 of ⅜ to ¹⁄₂₀ inch diameter which rise at a rate in column 2 of 50 to 150 ft./hr. The feed is introduced into the column at a rate of 25 to 250 ft.$^3$ per ft.$^2$ of column cross-section per hour. The immiscible coolant in this application of the invention is a cold aqueous solution containing 0–28 weight percent of calcium chloride which enters the top of the dewaxing column 2 through line 4 via distributor head 28 and air gap 27 at a rate about equal to the feed rate of about 25 to 250 ft.$^3$ per ft.$^2$ of column cross section per hour and at a temperature of −40° to +60° F. The cold brine phase countercurrently contacts the rising dense dispersion of oil droplets, cooling them at a controlled rate of 1–4° F./minute. As the oil droplets are cooled, the wax present in the droplets crystallizes. At the top of the tower, an oil wax brine slurry is present. The cold waxy oil is separated from the cold brine through an annular brine trap 23 via openings 29 and 33.

In the top section 34 of the dewaxing column the dispersed oil droplets partially come together to form large irregular masses of oil wax slurry, as they come into contact with the brine coolant phase. By spraying the brine coolant phase through an air gap rather than directly into the liquid phase the vortex and back mixing normally associated with the injection of one fluid into another is avoided and the wax oil slurry is uniformly irrigated with the brine. The oil wax globules containing some entrained brine are withdrawn through opening 29 at a point below the air-liquid interface through the annular brine trap 32 which allows brine to run back into tower 2. By distributing the coolant through an air gap rather than directly into the liquid premature coating of the wax on the cold immiscible coolant spray head surface is prevented. The distance of the spray head above the liquid surface is 4 to 18 inches, but is not particularly critical. The total residence time of the dense dispersion of waxy oil droplets in tower is 20 to 45 minutes.

Figure 5:
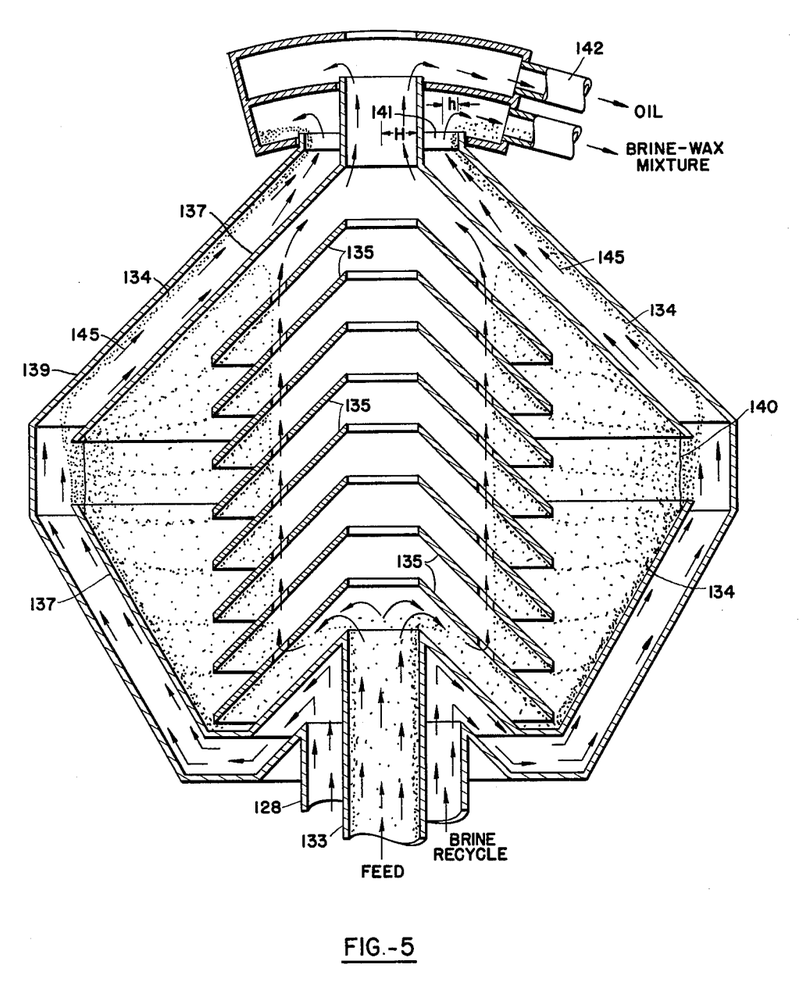
FIGURE 5 is a diagrammatic, elevational view of a disc stack centrifuge apparatus used in accordance with this invention.

Referring now to FIG. 5 of the drawings, the crystallized wax oil mixture withdrawn via line 3 (FIG. 1) and with about 10 to 15% by volume total brine concentration is charged to the disc stack centrifuge through line 133. In this particular embodiment wherein the centrifuge is used to separate wax crystals from dewaxed oil, the coolant selected is one that has a greater density than either the wax crystals, or the dewaxed oil. However, it is pointed out that a coolant of smaller density than the wax crystals and oil may be used to crystallize the wax, and the more dense brine added just prior to the centrifugation step. The brine, being more dense than the feed, forms a coating on the discs 135 on which wax crystals 134 may float without coating and plugging the disc surfaces. The brine also coats the inner surfaces of the dividing cone 137. The circular rotation of the centrifuge thrusts the wax crystals which are heavier than the oil outward, concentrating them at interface 140 while the lighter oil is removed from the top of the centrifuge through line 142. A separate recycle brine river is introduced through line 128 and controls the position of interface 140 and gradually erodes away the accumulated wax crystals from interface 140 removing them with the brine solution through discharge port 141. Dividing cone 137 and the outer shell of the centrifuge bowl 139 provide the containing surfaces for the brine to recycle river 145 after removal from the centrifuge. The wax crystals float to the surface of the brine and are removed from the brine by skimming it from the surface of the brine or by draining the brine from the wax crystals. The small amount of brine remaining in the separated crystals is removed by melting the crystals and decanting the lower brine layer.

By controlling the brine river recycle rate the brine crest "$h$" at the discharge port 141 is regulated as to its height. This in turn regulates the position of the oil brine interface 140 relative to the peripheral opening in dividing cone 137, which determines the amount of wax that is eroded away by the brine river stream 145. In order to obtain efficient separation of the oil from the wax, it is necessary to accurately position the oil wax interface so that no wax passes out with the oil and a minimum amount of oil passes out with the wax. Heretofore, accurate positioning of the interface could only be accomplished by carefully selecting the oil ring dam radius H. Any variation in the densities of the feed materials charged to the centrifuge or the concentration of solids would relocate the previously established interface 140 and would necessitate stopping the centrifuge and readjusting the oil ring dam radius. Also the use of the brine recycle river has obviated the necessity of using narrow peripheral discharge nozzles used in conventional machines and which tended to clog.

The warm immiscible coolant removed from the bottom of column 2 (FIG. 1) through line 7 is taken to a similar dense dispersion contacting column where it is heat exchanged with the cooled dewaxed oil in order to conserve refrigeration.

In one application of my invention, waxy oils containing enough wax to have an undesirable effect on the pour points of the oil, form a wax haze, render the oil too viscous, or waxy oils from which it is desirable to separate the wax as a principal product, may be treated. In dewaxing petroleum oils, sufficient solvent or diluent may be added to render the oil fluid enough to be easily separated. Solvents are also sometimes used to facilitate the separation of the wax cake from the dewaxed oil. Nonsolvents for the wax may also be added to the feeds which aid in the crystallization of the wax from the oil. These nonsolvents may, at the same time, be solvents for the oil. Though many different immiscible coolants might be used for direct cooling with the waxy oil to be treated, one of the preferred coolants is a calcium chloride brine solution. The concentration of the calcium chloride in the coolant is sufficient to maintain the desired density difference between it and the feed that is to be dewaxed and to lower its freezing point to a temperature below that at which the feed is to be dewaxed. For some feeds which can be dewaxed, at temperatures above the freezing point of water, no calcium chloride need be used in the water coolant. The wax crystals that are separated from the dewaxed oil generally contain a certain amount of occluded or entrained oil. The amount of entrained oil can be substantially reduced by a brine wash, the addition of dewaxing solvents, and/or the addition of a crystal modifier to aid in the filtration or centrifugation step.

This invention is further exemplified by the various runs reported in the following examples.

EXAMPLE 1

A Kuwait middle distillate boiling in the range of about 560 to 640° F., having a cloud point of about 42° F. and a pour point of about 40° F. and containing about 12 wt. percent wax, was sprayed into a treating column in the form of a dense dispersion of uniform diameter oil droplets of about .007 ft. diameter. The inlet temperature of the feed was about 70° F. The spray area was protected from the continuous phase brine coolant stream vortex by means of an annular baffle of a vertical height of about 1 to 4 inches. The immiscible coolant comprises a 28% calcium chloride brine solution which was fed to the top of the tower at a temperature of about −5° F. The sprayed oil droplets form a dense dispersion and rise as a dense bed of uniform size spheres countercurrently to the descending coolant phase at a velocity of about .015 ft./sec. The oil holdup or volume density of the oil droplets was about 75% of the tower volume. This provides a chilling rate of about 2–3° F./ minute. The wax in the middle distillate crystallizes within the sprayed droplets and form a wax oil slurry at the top of the tower and was withdrawn at a temperature of about 0° F. The continuous immiscible cooling phase was withdrawn from the bottom of the tower at a temperature of about 65° F. Additional brine solution was added to the wax oil slurry withdrawn from the top of the tower so that the slurry contained a total of approximately 12 percent by volume of occluded brine. The wax oil brine slurry was then sent to the centrifuge which separates the wax from the dewaxed oil. The resulting dewaxed oil had a pour and cloud point of approximately 0° F. It is found that the concentration of wax in the middle distillate is reduced to 0% (by MEK analysis at 0° F.).

Figure 4:
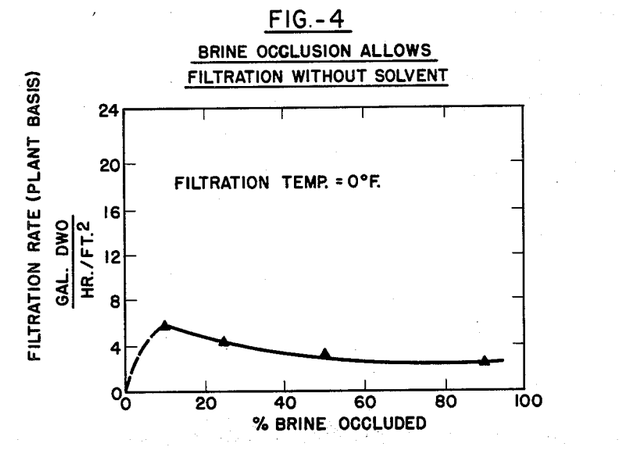
FIGURE 4 relates to dewaxing and filtration of wax crystals from the dewaxed oil wax slurry and shows the effect of the concentration of the occluded brine in the feed to the filter on the filter rate of the waxy oil slurry.

The separation of the wax crystals from the oil may be carried out either by filtration or by centrifugation. Addition of a solvent to the waxy oil feed or to the precipitated wax oil slurry directly and advantageously affects the rate at which the wax and oil can be separated. I have, however, unexpectedly found that a total concentration of 10–15% by volume of the calcium chloride brine coolant in the wax oil slurry, as described above, provides an efficient economical rate of separation of the wax from the oil without the addition of a solvent. This rate is not as high as obtained with the solvent; however, it results in substantial savings of equipment required to add the solvent and strip the solvent from the dewaxed oil, and these savings easily make up for the slower rate of separation. It can be seen from FIG. 4 of the drawings that when between 10 and 15% of brine by volume, based on the wax oil slurry, is occluded, that a filter rate of about 5.5 gallons of dewaxed oil/hr./ft.$^2$ is obtained. The occlusion of the brine with the oil during chilling produces a filtratable wax cake without the need of solvent. When neither brine nor solvent is added to the oil, the chilled wax oil mass is impossible to filter. Greater amounts of brine, up to 90 percent for example, reduces the oil rate through the filter to 2.6 dewaxed oil/hr./ft.$^2$. Even with solvent present, as the amount of occluded brine is increased, the advantage gained by solvent is gradually eradicated. The presence of the brine in the cooling tower while chilling helps to prevent adjacent wax crystals from locking up to form a gelatinous matrix which holds on to the oil. With brine the system remains fluid and the oil-brine liquid is released from the wax. Washing the filtered crystallized wax slurry with cold brine produces about a three-fold reduction in the occluded oil content of the wax (from 53 percent to 19 percent). Washing with brine has a marked advantage over solvent washing in that a solvent recovery step is not required. The effectiveness of the brine washing is further increased by the addition of a specific nonionic surface active agent to the brine wash. I have found that the addition of at little as .1 to 3 weight percent of Tergitol NP–35 (a commercially available nonylphenolethoxy compound) decreases the oil content of the wax from about 19 percent to about 12 percent by weight.

I have also found that the addition of a critical amount of a crystal modifier to either the centrifugation or filtration separation process substantially increases the rate at which the wax can be separated from the wax oil slurry. The crystal modifier found to be particularly effective was HO–10 which is commercially available and which chemically is an alkylated polystyrene having a cryoscopic molecular weight of 700 to 3000. When added to a middle distillate which was mixed with a ratio of one to one of distillate to MEK solvent in the ratio of .05 to .09 weight percent of modifier to distillate, the filter rate was found to increase about 300 to 400 percent. The effectiveness of the modifier is, however, related to a certain degree to the concentration of solvent and brine present in the mixture to be separated.

EXAMPLE 2

A lubricating oil stock boiling in the range of 850 to 1100° F. having a 20% by weight concentration of wax, a pour point of 115° F. and a cloud point of 125° F. is diluted with two volumes of a solvent consisting of 56 percent MEK and 44 percent toluene and is heated to a temperature of 115° F. and countercurrently contacted with a brine coolant in the manner described in Example 1. A 28 percent by weight solution of calcium chloride brine was fed to the wax chiller at a temperature of −5° F. and the lubricating oil stock was sprayed into the bottom of the chiller in the form of dense dispersion of uniform size droplets of approximately 1/8 in. diameter which rise in the column countercurrently to the descending continuous cooling phase at a velocity of about 0.018 ft./sec. This provides cooling of the droplets at a uniform rate of about 2° F. per minute. The wax oil slurry containing about 12% by volume of occluded brine was removed from the top of the tower and centrifuged in accordance with the previously discussed procedure. The deoiled wax was found to contain 31 percent by weight of oil.

EXAMPLE 3

A whole Zelten crude oil having a pour point of 50–55° F. is heated to 200° F. and slowly air cooled to 90° F. It was then fed at a rate of 350 b./d./ft.$^2$ of column cross-section in the form of a dense dispersion of uniform size oil droplets having a diameter of about 3/16 inch. The dense dispersion rises in the column at a velocity of about 0.02 ft./sec. Water at a temperature of about 37° F. enters the top of the column at a rate of 157 b./d./ft.$^2$ of column and slowly chills the crude oil droplets at a rate of 2°/minute to 40° F. as it descends in the column countercurrent to the rising oil droplets. The water leaves the bottom of the column at a temperature of about 87° F. The chilled crude oil plus precipitated solids are removed from the top of the column and then sent to the centrifuge which removes about 8% solids based on the feed. The dewaxed oil was found to have a pour point of 40° F. and was taken for further processing.

EXAMPLE 4

A Kuwait heavy distillate boiling in the range of about 640° F. to 730° F., having a cloud point of about 42° F. and a pour of about 40° F. and containing about 10% by weight of wax was countercurrently contacted and dewaxed in accordance with the procedure described in Example 1. A wax oil slurry containing about 15% by volume of occluded brine was removed from the top of the contacting tower. This was charged to a nine inch nominal diameter disc stack centrifuge operating at 10,000 r.p.m. modified in accordance with one embodiment of this invention, as previously discussed, at a rate corresponding to 45 gal. of oil wax slurry per minute. The corresponding brine recycle rate to maintain the brine oil interface in the desired position for wax removal was .97 to 1.91 gal. per minute of recycle brine, which would compensate for a variation in specific gravity of the oil feed of 0.85 to 0.89 respectively. By regulating the brine recycle rate the interface location could be changed continuously without stopping the machine to compensate for a change in specific gravity of the oil. This invention overcomes the necessity of stopping an unmodified disc stack centrifuge to change the ring dam diameter to compensate for a change in specific gravity of the oil feed.

EXAMPLE 5

In another application of the invention, saline water is converted to potable water. Saline water is charged to the top of the dense dispersion column at a temperature of 31° F. in the form of dense dispersion of uniform diameter droplets and is chilled to 28° F. by countercurrent contact with an ascending continuous coolant phase of a middle distillate oil entering the bottom of the column at 21.8° F. The coolant leaves the top of the column at a temperature of about 30° F. Chilling saline water to 28° F. crystallizes about 10% by weight of the saline water feed to salt free ice crystals. The crystallized water and mother liquor may be transferred to a basket centrifuge wherein the ice crystals are separated from the mother liquor. There is no contamination of the crystals with the oil. The ice crystals are then melted to obtain desalinated or potable water.

The application of this invention to feeds containing varied crystallizable materials, with various immiscible coolants and with various solvents is readily apparent to one skilled in the art from the above description. The critical feature of this invention is in providing a dense dispersion of uniform size droplets which do not agglomerate or stick together and move upward at a controlled rate and which are chilled by countercurrently contacting a descending continuous phase of coolant in such a manner that an efficient heat exchange between the droplets and coolant are obtained and uniform crystal growth of the crystallizable material within the droplets is obtained.

The invention is to be limited only by the appended claims.

What is claimed is:

1. An apparatus for obtaining a stable uniformly moving dense dispersion of uniform diameter liquid droplets comprising a vertical cylindrical column, a spray head with evenly spaced protruding orifices, said spray head having an outer edge, an annular baffle placed at the outer edge of the spray head at one end of the column, means for introducing an immiscible liquid coolant which forms a continuous phase at the other end of the column, an annular chamber situated at one end of the column and adapted for removing liquid, said annular chamber extending all the way around the top of the column and for part of the length of the top of the vertical cylindrical column, said chamber forming an integral top portion with said column and having a greater cross-section than said column, said chamber extending in a lower radial direction and communicating with the upper portion of said column, at least one take-off conduit radially extending from the top of said annular chamber and communicating therewith, said take-off conduit extending horizontally for a short distance and then vertically downwardly to the bottom of said chamber, and means at the other end of said column for removing liquid.

2. An apparatus for obtaining a stable uniformly moving dense dispersion of uniform diameter liquid droplets comprising a vertical cylindrical column, a spray head with evenly spaced protruding orifices, said spray head having an outer edge, an annular baffle placed at the outer edge of the spray head at one end of the column, means for introducing an immiscible liquid coolant which forms a continuous phase at the other end of the column, an annular chamber situated at one end of the column and adapted for removing liquid, said chamber extending all the way around the top of said column and for a part of the length of the top of the column and communicating with the upper portion of said column, and means at the other end of said column for removing liquid.

References Cited by the Examiner

UNITED STATES PATENTS

| 1,601,897 | 10/1926 | Wiley et al. | |
| 1,905,185 | 4/1933 | Morris | 165—107 X |
| 2,088,497 | 7/1937 | Tijmstra | 196—14.52 X |
| 2,141,622 | 12/1938 | Setzler | 209—37 X |

(Other references on following page)

| | | | |
|---|---|---|---|
| 2,609,277 | 9/1952 | McNamara | 196—14.52 X |
| 2,785,878 | 3/1957 | Conrad | 257—1 |
| 2,796,237 | 6/1957 | Nettel | 257—1 |
| 2,898,271 | 8/1959 | Findlay | 196—14.5 X |
| 2,903,411 | 9/1959 | Shuman | 208—37 |
| 2,927,008 | 3/1960 | Shockley | 23—293 |
| 2,958,461 | 11/1960 | Peltzer | 233—14 |
| 2,981,773 | 4/1961 | Weedman | 260—707 |
| 3,023,090 | 2/1962 | Kolner | 23—273 |
| 3,047,214 | 7/1962 | Downing | 233—14 |
| 3,083,154 | 3/1963 | Gersic et al. | 196—14.5 X |

FOREIGN PATENTS 512,346 4/1955 Canada.
545,299 12/1921 France.

NORMAN YUDKOFF, *Primary Examiner.*

ALPHONSO D. SULLIVAN, *Examiner.*

F. E. DRUMMOND, H. LEVINE,
*Assistant Examiners.*